United States Patent
Yamada et al.

(10) Patent No.: US 7,773,271 B2
(45) Date of Patent: Aug. 10, 2010

(54) FILTER CIRCUIT, AND IMAGE SENSOR, IMAGE SENSOR MODULE, AND IMAGE READING APPARATUS PROVIDED THEREWITH

(75) Inventors: Nobuyuki Yamada, Kyoto (JP); Yoshihiro Ikefuji, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 989 days.

(21) Appl. No.: 11/521,795

(22) Filed: Sep. 15, 2006

(65) Prior Publication Data

US 2007/0070215 A1 Mar. 29, 2007

(30) Foreign Application Priority Data

Sep. 15, 2005 (JP) .............................. 2005-268047

(51) Int. Cl.
*H04N 1/04* (2006.01)

(52) U.S. Cl. ..................... 358/474; 358/483; 358/463; 358/512; 358/513; 358/514; 348/224.1; 348/241; 382/284; 382/260

(58) Field of Classification Search ................. 358/483, 358/463, 512–514, 482; 382/284, 260; 348/224.1, 348/243, 308, 241, E3.021, E5.079
See application file for complete search history.

(56) References Cited

U.S. PATENT DOCUMENTS

| | | | | |
|---|---|---|---|---|
| 4,982,294 A | * | 1/1991 | Morton et al. | ............... 358/465 |
| 5,408,337 A | * | 4/1995 | Kanda | ........................ 358/447 |
| 7,075,574 B2 | * | 7/2006 | Niko | ........................... 348/241 |
| 2004/0252208 A1 | * | 12/2004 | Lee | ............................... 348/241 |
| 2005/0185071 A1 | * | 8/2005 | Takahashi et al. | ............ 348/254 |
| 2005/0185223 A1 | * | 8/2005 | Takahashi et al. | ........... 358/3.26 |
| 2006/0115159 A1 | * | 6/2006 | Rexhepi | ...................... 382/199 |
| 2009/0160992 A1 | * | 6/2009 | Inaba et al. | .................. 348/308 |

FOREIGN PATENT DOCUMENTS

| | | |
|---|---|---|
| JP | 5-59995 | 8/1993 |
| JP | 10-126228 | 5/1998 |
| JP | 11-195963 | 7/1999 |
| JP | 2002-185309 | 6/2002 |
| JP | 2002-190720 | 7/2002 |

* cited by examiner

*Primary Examiner*—Negussie Worku
(74) *Attorney, Agent, or Firm*—Fish & Richardson P.C.

(57) ABSTRACT

A filter circuit has: a first and a second current mirror circuit that are each built with a plurality of transistors and that respectively pass a first and a second mirror current according to a constant current; an input terminal via which an input pulse signal is fed in; a first transistor that, in response to the signal fed in via the input terminal and by using a supply voltage, makes the first current mirror circuit operate; a second transistor that, operating in inverted synchronism with the first transistor, in response to the signal fed in via the input terminal and by using a ground voltage, makes the second current mirror circuit operate; a capacitor that is charged by the first mirror current and that is discharged by the second mirror current; and an output terminal via which a voltage at one end of the capacitor is fed out. Thus, the filter circuit permits its filter constant to be set accurately in a wide range without relying on the driving capacity of the input signal, and can be integrated without an undue increase in device scale.

20 Claims, 10 Drawing Sheets

FILTER CIRCUIT, AND IMAGE SENSOR, IMAGE SENSOR MODULE, AND IMAGE READING APPARATUS PROVIDED THEREWITH

This application is based on Japanese Patent Application No. 2005-268047 filed on Sep. 15, 2005, the contents of which are hereby incorporated by reference.

BACKGROUND OF THE INVENTION

1. Field of the Invention

The present invention relates to a filter circuit, and also relates to an image sensor, an image sensor module, and an image reading apparatus incorporating such a filter circuit.

2. Description of Related Art

In products, such as scanners and digital MFPs (multifunction peripherals) that incorporate a flat-bed-type image-reading apparatus, their construction often requires that signal lines be laid around over long distances, as is typically the case with the signal lines for connecting between a set circuit board and an image sensor module and the signal lines for connecting, within an image sensor module, between I/Os and an image sensor IC.

In particular, a contact-type image sensor module, which is so constructed as to have a plurality of image sensor ICs arranged end to end along the row in which photodetective elements are arranged, requires that signal lines be laid around over very long distances within the module. This makes it more likely that extraneous noise caught by the signal lines causes the logic portion of the image sensor ICs to operate abnormally and produces disturbance in the acquired image signal.

For this reason, conventional image reading apparatuses generally adopt configurations in which RC filters are inserted in signal lines for the purpose of eliminating extraneous noise.

As a conventional technology related to the present invention, there has been disclosed and proposed a filter circuit that is characterized by being provided with: a charge/discharge capacitor; an RC filter that is connected to the capacitor and that outputs an output voltage; a charge circuit that charges the capacitor when an input voltage is higher than the terminal voltage of the capacitor; and a discharge circuit that discharges the capacitor when the input voltage is lower than the terminal voltage of the capacitor (see JP-A-2002-190720).

As other conventional technologies related to the present invention, there have been disclosed and proposed a variety of digital filters that sample input signals a plurality of times and that choose one of the sampling results on a majority decision basis (see, e.g., JP-U-H5-059995, JP-A-H10-126228, JP-A-H11-195963, and JP-A-2002-185309).

To be sure, inserting RC filters in signal lines helps reduce the adverse effects of extraneous noise and thereby enhance the operating accuracy of image sensor ICs, and hence contributes to enhancement of the quality of the acquired image signal.

However, since the time constant (filter constant) of an RC filter depends on the arithmetic product of the resistance and capacitance of its constituent resistor and capacitor, when RC filters are integrated into an image sensor IC, the restrictions on the chip area naturally imposes restrictions on the filter constant. Thus, in a case where different filter constants need to be set in a wide range for different signal lines, RC filters need to be built with discrete components. This is one of the factors that have conventionally been hampering the efforts to reduce the device scale.

Incidentally, with the conventional technology disclosed in JP-A-2002-190720 mentioned above, it is possible to control the time constant and the input signal amplitude of a filter circuit without varying the resistance and capacitance used therein. This conventional technology, however, has the following disadvantage. According to the technology, an input signal is fed both to the supply voltage line of the charge circuit (current mirror circuit) and to the reference voltage line of the discharge circuit (current mirror circuit), and, according to which of the signal level of the input signal and the terminal voltage of the charge/discharge capacitor is higher, whether to operate the charge circuit and the discharge circuit is switched, and hence whether to charge or discharge the capacitor is switched. Thus, unless the driving capacity of the input signal is sufficiently raised, the charge circuit and the discharge circuit cannot be driven. This may produce an error in the charge/discharge current through the capacitor, causing the filter constant to deviate from the desired value.

On the other hand, with the conventional technologies disclosed in JP-U-H5-059995, JP-A-H10-126228, JP-A-H11-195963, and JP-A-2002-185309 mentioned above, it is possible to eliminate extraneous noise without the need for a resistor and a capacitor. Disadvantageously, however, these technologies are prone to malfunctioning in the presence of continuous pulse noise synchronous with the sampling clock of the input signal (i.e., noise containing pulses with pulse widths longer than the set-up and hold time of flip-flops).

SUMMARY OF THE INVENTION

In view of the conventionally encountered inconveniences discussed above, it is an object of the present invention to provide a filter circuit that permits its filter constant to be set accurately in a wide range without relying on the driving capacity of the input signal and that can be integrated without an undue increase in device scale, and to provide an image sensor, an image sensor module, and an image reading apparatus incorporating such a filter circuit.

To achieve the above object, according to the present invention, a filter circuit is provided with: a first current mirror circuit that is built with a plurality of transistors and that passes a first mirror current according to a constant current; a second current mirror circuit that is built with a plurality of transistors and that, operating in inverted synchronism with the first current mirror circuit, passes a second mirror current according to a constant current; an input terminal via which an input pulse signal is fed in; a first transistor that, in response to the signal fed in via the input terminal and by using a supply voltage, makes the first current mirror circuit operate; a second transistor that, in response to the signal fed in via the input terminal and by using a ground voltage, makes the second current mirror circuit operate, the second transistor operating in inverted synchronism with the first transistor; a capacitor that is charged by the first mirror current and that is discharged by the second mirror current; and an output terminal via which a voltage at one end of the capacitor is fed out.

DETAILED DESCRIPTION OF PREFERRED EMBODIMENTS

Figure 1:
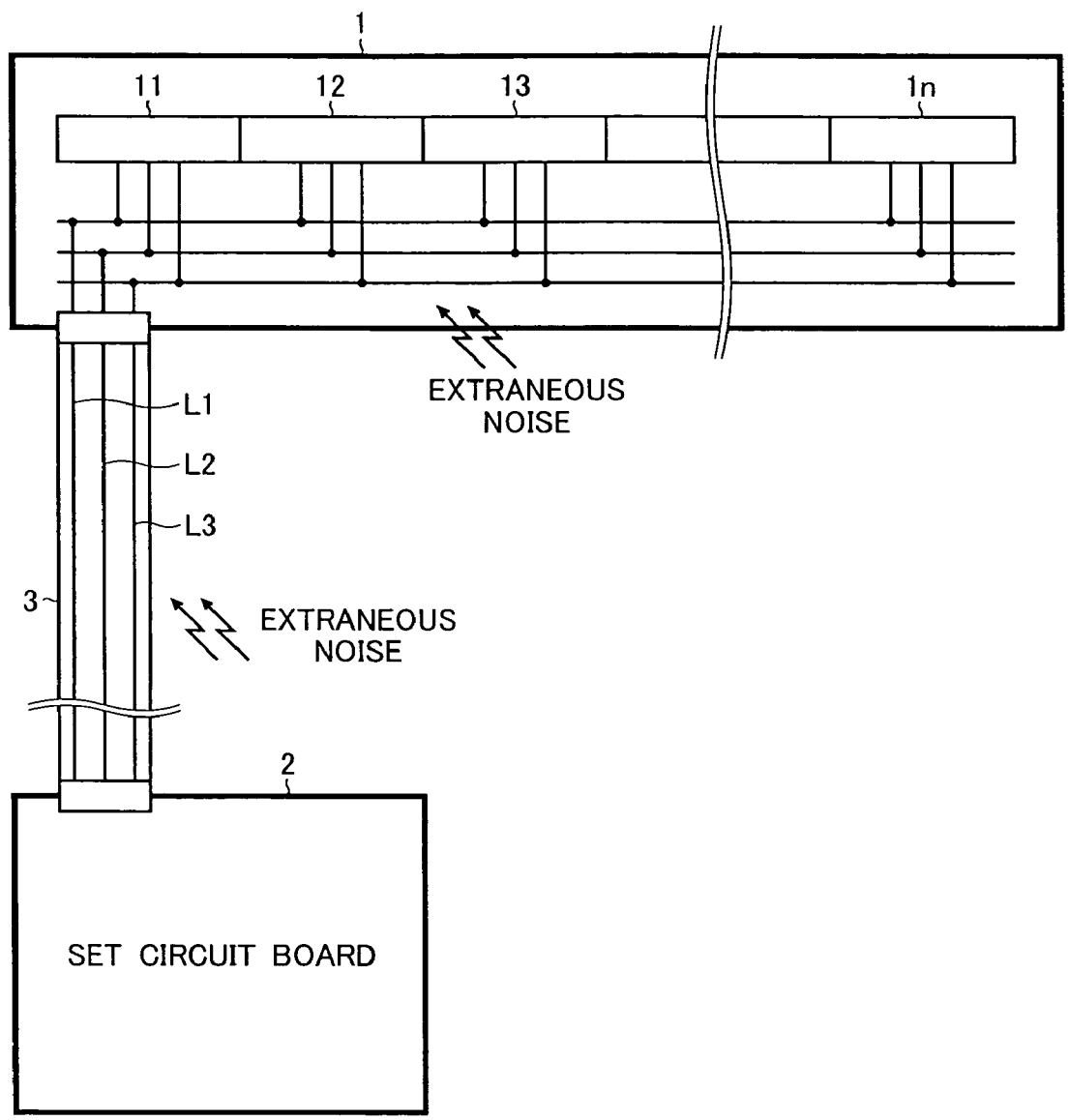
FIG. 1 is a diagram schematically showing, as an embodiment of the present invention, an image reading apparatus incorporating an image sensor module according to the present invention.

FIG. 1 is a diagram schematically showing, as an embodiment of the present invention, an image reading apparatus incorporating an image sensor module according to the present invention.

As shown in FIG. 1, the image reading apparatus of the embodiment includes a contact-type image sensor module (hereinafter referred to as the "CIS module 1", where "CIS" stands for "contact image sensor"), a set circuit board 2, and a flexible cable 3. Needless to say, in addition to the already mentioned components, the image reading apparatus of the embodiment further includes, though omitted from illustration, components essential to realize the functions of an image reading apparatus, such components including a light source for illuminating a document-to-be-read, and a lens array for directing the light reflected from the document-to-be-read to the CIS module 1.

Incidentally, CIS modules according to the present invention are designed to be incorporated in image reading apparatuses for use in facsimile machines, printers, digital copiers, scanners, and multifunction peripherals (MPFs) furnished with more than one of the just mentioned capabilities, that is, products in general that incorporate sheet-feed-type or flat-bed-type image reading apparatuses.

The CIS module 1 has n ($\geq 2$) image sensor ICs 11 to 1n arranged end to end along the row in which photodetective elements are arranged. The image sensor ICs 11 to 1n are semiconductor integrated circuit devices that, by use of photodetective elements (of a CCD or CMOS type, where "CCD" stands for "charge-coupled device" and "CMOS" stands for "complementary metal-oxide semiconductor") arranged in a row (or in three rows for R, G, and B) along the width of the document-to-be-read, produce an analog image signal according to the amount of light reflected from the document-to-be-read and then output the analog image signal serially on a pixel-by-pixel basis. On this CIS module 1, signal lines L1 to L3 are laid over a length that depends on the width of the document-to-be-read, specifically tens of centimeters (e.g., in products that can handle A4-size documents, about 20 cm). For higher resolutions, the photodetective elements of the image sensor ICs 11 to 1n may be arranged in a zigzag.

The set circuit board 2 is a circuit board on which various components are mounted, among which is a CPU (central processing unit) that controls the CIS module 1. On one hand, the CPU transmits to the CIS module 1 input pulse signals (a clock pulse signal CLK, a start pulse signal SP, and a mode switch signal MODE) that are necessary to drive and/or control the image sensor ICs 11 to 1n. On the other hand, the CPU receives, after conversion into a digital image signal, the analog image signal from the CIS module 1.

The flexible cable 3 is a cable for electrically connecting together the CIS module 1 and the set circuit board 2. The flexible cable 3 is given a length that depends on the height of the document-to-be-read (i.e., the distance over which it is scanned), specifically tens of centimeters (e.g., in products that can handle A4-size documents, about 50 cm). Although FIG. 1 shows, as representatives of the signal lines included in the flexible cable 3, only the signal lines L1 to L3 for transmitting the input pulse signals (the clock pulse signal CLK, start pulse signal SP, and mode switch signal MODE) that are necessary to drive and/or control the image sensor ICs 11 to 1n, it should be understood that, in reality, there are laid, and hence the flexible cable 3 includes, various signal lines other than those specifically mentioned here.

In the image reading apparatus constructed as described above, as a document-to-be-read is scanned along its height with the CIS module 1, which is as wide as the document-to-be-read, a two-dimensional image signal is produced. This construction employing the CIS module 1 (i.e., the contact-type construction), in comparison with the lens-imaging-type construction, requires no extra space for accommodating the focal length between a lens and a sensor, and thus contributes to miniaturization of the apparatus.

In the image reading apparatus constructed as described above, as described previously, the flexible cable 3 is very long, and so is the distance over which the signal lines L1 to L3 are laid within the CIS module 1. This makes it more likely that extraneous noise is caught by the signal lines L1 to L3.

Next, the image sensors IC 11 to 1n of a first embodiment of the present invention will be described in detail.

Figure 2:
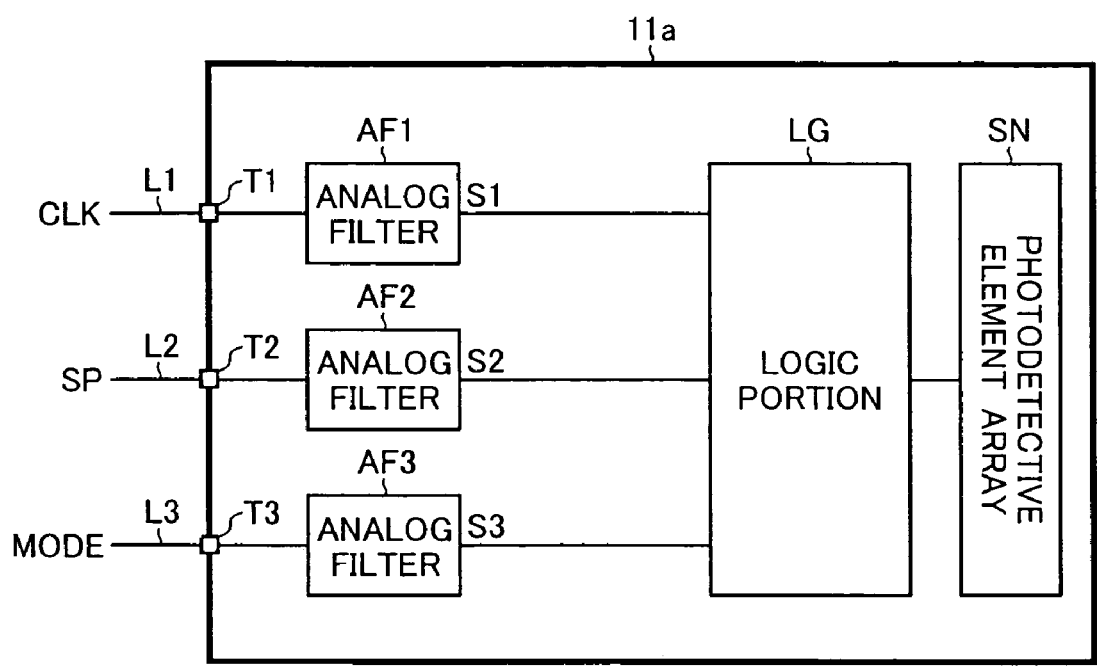
FIG. 2 is a block diagram of the image sensors IC 11 to 1n in a first embodiment of the present invention.

FIG. 2 is a block diagram of the image sensors IC 11 to 1n in the first embodiment.

Although FIG. 2 shows the configuration of, as a representative of all the image sensor ICs in the first embodiment, only the image sensor IC 11 (hereinafter identified as the "image sensor IC 11a"), it should be understood that the other image sensor ICs 12 to 1n each have the same configuration as shown in FIG. 2.

As shown in FIG. 2, in the first embodiment, the image sensor IC 11a includes pads T1 to T3, analog filter circuits AF1 to AF3, a logic portion LG, and a photodetective element array SN.

The clock pulse signal CLK, which is transmitted across the signal line L1, is a clock signal that is necessary to drive the image sensor ICs 11 to 1n, and is fed via the pad T1 and through the analog filter circuit AF1 to the logic portion LG. Incidentally, the clock pulse signal CLK has a frequency of several megahertz (in this embodiment, 5 MHz), and has a pulse width of several hundred nanoseconds (in this embodiment, 100 ns) (see FIG. 3).

The start pulse signal SP, which is transmitted across the signal line L2, is an instruction signal that requests the starting of the reading of a document-to-be-read, and is fed via the pad T2 and through the analog filter circuit AF2 to the logic portion LG. Incidentally, the start pulse signal SP is a binary signal of which the logic level shifts in synchronism with the clock pulse signal CLK; specifically, when the document-to-be-read starts to be read, the start pulse signal SP is kept at an "enable" (logically high) level for one period (in this embodiment, 200 ns) of the clock pulse signal CLK (see FIG. 3).

The mode switch signal MODE, which is transmitted across the signal line L3, is a selection signal that switches the document reading resolution selectively between 300 dpi (dots per inch) and 600 dpi, and is fed via the pad T3 and through the analog filter circuit AF3 to the logic portion LG.

Figure 3:
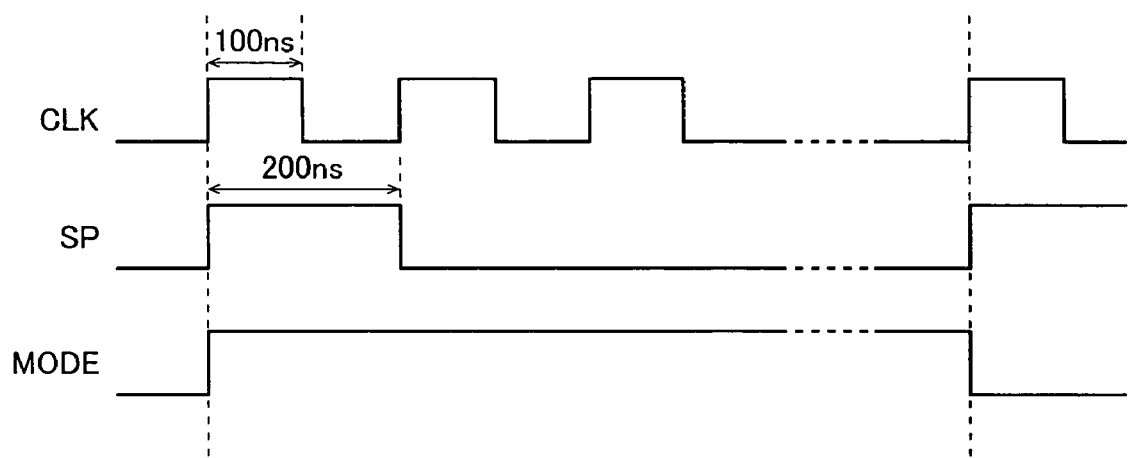
FIG. 3 is a diagram showing the waveforms of input pulse signals (CLK, SP, and MODE)

Incidentally, the mode switch signal MODE is a binary signal of which the logic level shifts in synchronism with the clock pulse signal CLK; specifically, during the period after the start until the end of the reading of a document-to-be-read, the mode switch signal MODE is kept at one logic level (see FIG. 3).

The analog filter circuits AF1 to AF3, serving as analog filter means, respectively perform wave shaping on the input pulse signals (CLK, SP, and MODE) such that extraneous noise caught by the signal lines L1 to L3 is eliminated from those signals, and then feed the thus waveform-shaped signals, as output pulse signals S1 to S3, to the logic portion LG.

Based on the output pulse signals S1 to S3 from the analog filter circuits AF1 to AF3, the logic portion LG produces an analog image signal by using the photodetective element array SN, and controls pixel-by-pixel serial output of the analog image signal.

Next, an example of the configuration of the analog filter circuits AF1 to AF3 will be described in detail.

Figure 4:
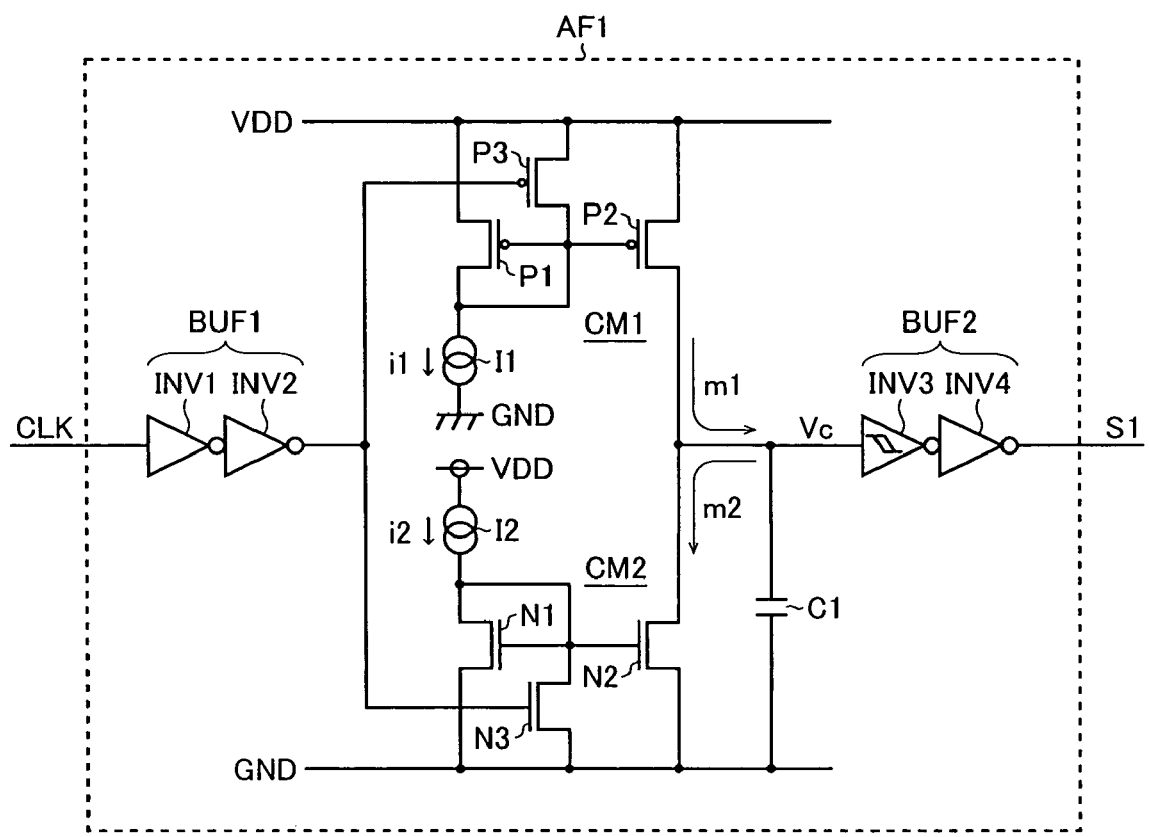
FIG. 4 is a circuit diagram showing an example of the configuration of the analog filter circuits AF1 to AF3.

FIG. 4 is a circuit diagram showing an example of the configuration of the analog filter circuits AF1 to AF3.

Although FIG. 4 shows an example of the configuration of, as a representative, only the analog filter circuit AF1, it should be understood that the other analog filter circuits AF2 and AF3 each have the same configuration as shown in FIG. 4.

As shown in FIG. 4, in this example of configuration, the analog filter circuit AF1 includes: a first constant current source 11 of which one end is grounded; a second constant current source 12 of which one end is connected to a supply voltage; a first P-channel field-effect transistor P1 whose source is connected to the supply voltage, whose drain is connected to the other end of the first constant current source I1, and whose gate and drain are connected together; a second P-channel field-effect transistor P2 whose source is connected to the supply voltage and whose gate is connected to the gate of the first P-channel field-effect transistor P1; a first N-channel field-effect transistor N1 whose source is grounded, whose drain is connected to the other end of the second constant current source I2, and whose gate and drain are connected together; a second N-channel field-effect transistor N2 whose source is grounded and whose gate is connected to the gate of the first N-channel field-effect transistor N1; an input buffer BUF1 that buffers and outputs an input pulse signal (the clock pulse signal CLK); a third P-channel field-effect transistor P3 whose source is connected to the supply voltage, whose drain is connected to the gates of the first and second P-channel field-effect transistors P1 and P2, and whose gate is connected to the output end of the input buffer BUF1; a third N-channel field-effect transistor N3 whose source is grounded, whose drain is connected to the gates of the first and second N-channel field-effect transistors N1 and N2, and whose gate is connected to the output end of the input buffer BUF1; a capacitor C1 of which one end is connected to the drain of the second P-channel field-effect transistor P2 and to the drain of the second N-channel field-effect transistor N2 and of which the other end is grounded; and an output buffer BUF2 that outputs, as an output pulse signal S1, the voltage Vc at the one end of the capacitor C1.

The first and second constant current sources 11 and 12 serve as means for generating a first and a second constant current i1 and i2, respectively, each having a predetermined current level. Incidentally, using as the first and second constant current sources I1 and I2 bandgap compensation constant current sources, which require no resistive elements, makes it possible to generate a first and a second constant current i1 and i2 that are not influenced by variations in the ambient temperature, bringing about a more advantageous temperature characteristic than is obtained with RC filter circuits, which require resistive elements.

The transistors P1 and P2 together form a first current mirror portion CM1, which serves as a means for generating a first mirror current m1 commensurate with the first constant current i1. The ratio of the first constant current i1 to the first mirror current m1 can be adjusted adequately by accordingly adjusting the ratio of the gate area of the first P-channel field-effect transistor P1 to that of the second P-channel field-effect transistor P2.

The transistors N1 and N2 together form a second current mirror portion CM2, which serves as a means for generating a second mirror current m2 commensurate with the second constant current i2. The ratio of the second constant current i2 to the second mirror current m2 can be adjusted adequately by accordingly adjusting the ratio of the gate area of the first N-channel field-effect transistor N1 to that of the second N-channel field-effect transistor N2.

The capacitor C1 serves as a charging/discharging means by being charged by the first mirror current m1 and discharged by the second mirror current m2, and the terminal voltage Vc of the capacitor C1 is extracted to be used in the succeeding stage.

The input buffer BUF1 serves as means for enhancing the driving capacity of the clock pulse signal CLK, and is built with inverters INV1 and INV2 connected in series.

The output buffer BUF2 performs wave shaping on the terminal voltage Vc of the capacitor C1 to form it into the output pulse signal S1, and also serves as means for enhancing its driving capacity. The output buffer BUF2 is built with inverters INV3 and INV4 connected in series. The front-stage inverter INV3 is given hysteresis to operate with respect to two threshold voltages (an upper threshold voltage VthH and a lower threshold voltage VthL). Specifically, the output logic level of the inverter INV3 shifts from a first logic level to a second logic level when the terminal voltage Vc of the capacitor C1 becomes higher than the upper threshold voltage VthH, and thereafter, when it becomes lower than the lower threshold voltage VthL, the output logic level of the inverter INV3 returns from the second logic level to the first logic level.

Now, the operation of the analog filter circuit AF1 configured as described above will be described in detail with reference to FIG. 5 as well as FIG. 4.

Figure 5:
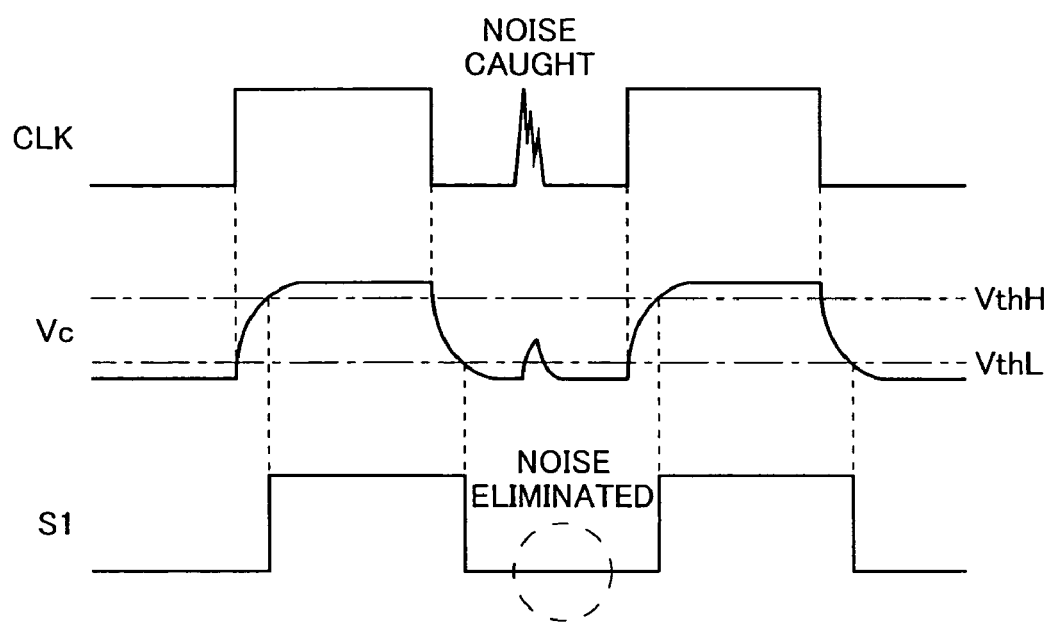
FIG. 5 is a diagram illustrating the operation of the analog filter circuit AF1.

FIG. 5 is a diagram illustrating the operation of the analog filter circuit AF1, and shows the behavior of, from above downward, the clock pulse signal CLK, the terminal voltage Vc of the capacitor C1, and the output pulse signal S1 as observed in their waveforms.

First, a description will be given of a case where the clock pulse signal CLK fed in is normal.

In this case, when the clock pulse signal CLK rises to high level, the transistor P3 turns off, and the transistor N3 turns on. This enables the first current mirror portion CM1 to perform mirror operation, and disables the second current mirror portion CM2 from performing mirror operation. As a result, a first mirror current m1 flows into the capacitor C1, making the terminal voltage Vc thereof rise with a predetermined time constant. Thereafter, when the terminal voltage Vc of the capacitor C1 becomes higher than the upper threshold voltage VthH of the inverter INV3, the output pulse signal S1 rises to high level.

On the other hand, when the clock pulse signal CLK falls to low level, the transistor P3 turns on, and the transistor N3 turns on. This disables the first current mirror portion CM1 from performing mirror operation, and enables the second current mirror portion CM2 to perform mirror operation. As a result, a second mirror current m2 flows out of the capacitor C1, making the terminal voltage Vc thereof fall with a predetermined time constant. Thereafter, when the terminal voltage Vc of the capacitor C1 becomes lower than the lower threshold voltage VthL of the inverter INV3, the output pulse signal S1 falls to low level.

In this way, while the clock pulse signal CLK fed in is normal, the output pulse signal S1 obtained from the analog filter circuit AF1 is nothing but the clock pulse signal CLK itself.

Next, a description will be given of a case where extraneous noise is caught by the signal line L1.

If, as shown in FIG. 5, extraneous noise is caught in a period in which the clock pulse signal CLK is supposed to remain at low level, the capacitor C1 is erroneously charged in a period in which it is supposed to be discharged. However, since extraneous noise is caught only instantaneously, the erroneous charging ends before the terminal voltage Vc of the capacitor C1 reaches the upper threshold voltage VthH of the inverter INV3, and therefore the terminal voltage Vc returns to normal within this period, in which it is supposed to be discharged. In this way, the output pulse signal S1 has a waveform having such extraneous noise eliminated therefrom.

With the analog filter circuit AF1 configured as described above, by adequately adjusting the first and second mirror currents m1 and m2, it is possible to set the filter constant in a wide range (e.g., several nanoseconds to several tens of microseconds). Thus, it is possible to set an optimum filter constant for each of the signal lines L1 to L3 (i.e., for each of the input pulse signals).

More specifically, in this embodiment, with respect to the analog filters AF1 and AF2, since the clock pulse signal CLK and the start pulse signal SP both have pulse widths of about several hundred nanoseconds, the first and second mirror currents m1 and m2 are made comparatively large so that the filter constants of the analog filters AF1 and AF2 are set in a range (several tens of nanoseconds) that does not influence the two input pulse signals; on the other hand. On the other hand, with respect to the analog filter circuit AF3, since the mode switch signal MODE has a far larger pulse width than the already mentioned two input pulse signals and is thus less prone to be influenced by filtering, priority is given to elimination of extraneous noise with the first and second mirror currents m1 and m2 sufficiently reduced so that the filter constant of the analog filter circuit AF3 is set to be several tens of microseconds. In this way, it is possible to properly and effectively enhance the resistance of each input pulse signal to noise.

With an RC filter circuit, giving it a filter constant as large as several tens of microseconds requires an extremely large resistance or capacitance. This makes it practically impossible to integrate the circuit. By contrast, with the analog filter circuit AF1 configured as described above, it is possible to give it a greater filter constant without varying a resistance or capacitance. This makes the circuit suitable for integration into an IC.

Moreover, the analog filter circuit AF1 configured as described above is so built that whether to enable or disable the first and second current mirror portions CM1 and MC2 is controlled by turning the transistors P3 and N3 on/off according to an input pulse signal (the clock pulse signal CLK) and thereby directly controlling the gate voltages of the transistors P1 and P2 and of the transistors N1 and N2. That is, with the analog filter circuit AF1 configured as described above, even in a case where the input buffer BUF1 used has a low driving capacity in terms of impedance, if only it can control the gates of the transistors P3 and N3, it exhibits no shortage of capacity for driving the first and second current mirror portions CM1 and CM2. This makes the charge/discharge current of the capacitor C1 less likely to develop an error, and thereby makes the filter constant less likely to deviate from the desired value.

Moreover, with the analog filter circuit AF1 configured as described above, by properly adjusting the balance between the first and second mirror currents m1 and m2, it is possible to enhance resistance to rising noise alone, or to enhance resistance to falling noise alone.

For example, in a case where the target to be filtered is, like the start pulse signal SP, an input pulse signal that shifts to high level only at the start of image reading, considering that it remains at low level for the most time, the first mirror current m1 may be reduced to enhance resistance to rising noise. By contrast, in a case where the target to be filtered is an input pulse signal whose logic level exhibits a shifting pattern inverted as compared with the just-mentioned one, considering that it remains at high level for the most time, the second mirror current m2 may be reduced to enhance resistance to falling noise.

Next, the image sensors IC 11 to 1n of a second embodiment of the present invention will be described in detail.

Figure 6:
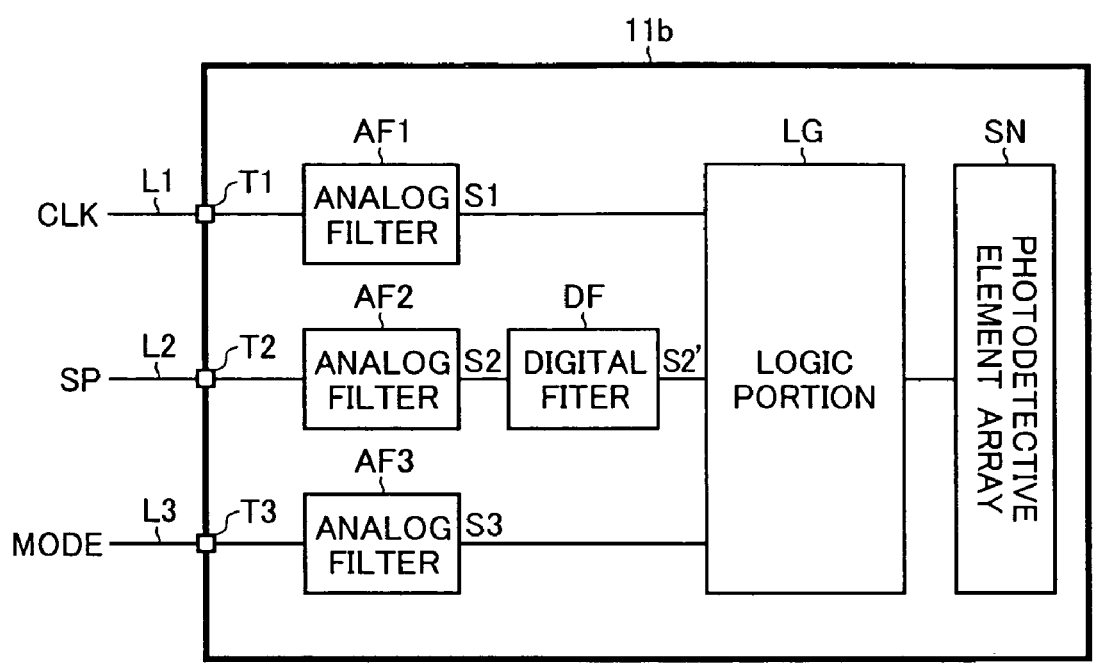
FIG. 6 is a block diagram of the image sensors IC 11 to 1n in a second embodiment of the present invention.

FIG. 6 is a block diagram of the image sensors IC 11 to 1n in the second embodiment.

Although FIG. 6 shows the configuration of, as a representative of all the image sensor ICs in the second embodiment, only the image sensor IC 11 (hereinafter identified as the "image sensor IC 11b"), it should be understood that the other image sensor ICs 12 to 1n each have the same configuration as shown in FIG. 6.

As shown in FIG. 6, in the second embodiment, the image sensor IC 11b has almost the same configuration as in the first embodiment, the only difference being that a digital filter circuit DF is provided in the stage succeeding the analog filter circuit AF2. Accordingly, here, such parts as are found also in the first embodiment are identified with common reference numerals and symbols as in FIG. 2, and no detailed description thereof will be repeated; thus, the following description proceeds with emphasis placed on the digital filter circuit DF, which constitutes the distinctive feature of this embodiment.

The digital filter circuit DF serves as means for sampling the output pulse signal S2 from the analog filter circuit AF2 a plurality of times and then outputting one of the sampling results on a majority decision basis.

Inserting this digital filter circuit DF makes it possible to properly compensate for the deviation in the timing of the start pulse signal SP resulting from the insertion of the analog filter circuit AF2. From the perspective of the digital filter circuit DF, the likeliness of malfunctioning in its majority decision operation is reduced thanks to the elimination of extraneous noise by the analog filter circuit AF2 provided in the preceding stage.

Incidentally, the filter constant (i.e. sampling frequency) of the digital filter circuit DF is advisably set greater than the filter constant of the analog filter circuit AF2.

Next, an example of the configuration of the digital filter circuit DF and its operation will be described in detail.

Figure 7:
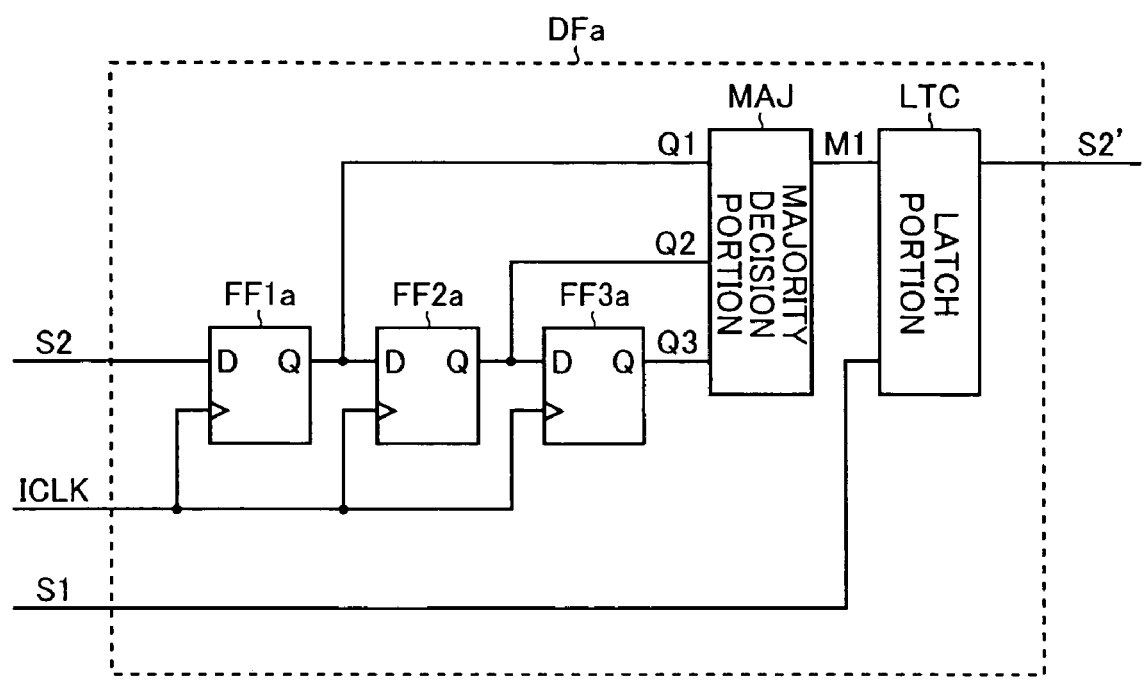
FIG. 7 is a circuit diagram showing an example of the configuration of the digital filter circuit DF.
Figure 8:
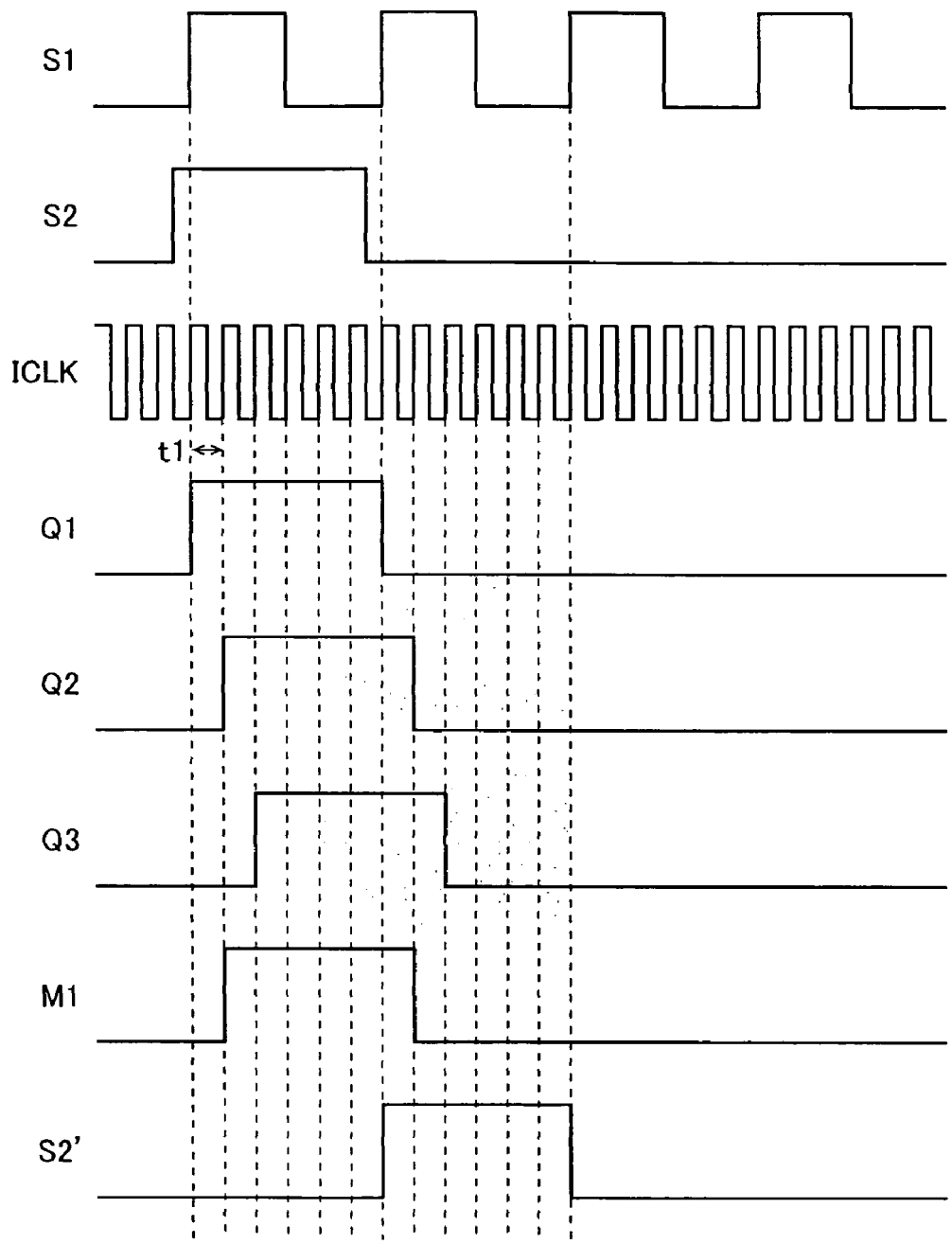
FIG. 8 is a diagram illustrating the operation of the digital filter circuit DFa.

FIG. 7 is a circuit diagram showing an example of the configuration of the digital filter circuit DF (hereinafter identified as the "digital filter circuit DFa"), and FIG. 8 is a diagram illustrating the operation of the digital filter circuit DFa.

As shown in FIG. 7, in this example of configuration, the digital filter circuit DFa includes D flip-flops FF1a, FF2a, and FF3a, a majority decision portion MAJ, and a latch portion LTC.

The D flip-flop FF1a receives, at the data input terminal (D) thereof, the output pulse signal S2 from the analog filter circuit AF2 (i.e., the start pulse signal SP as it has gone through filtering). The D flip-flop FF2a receives, at the data input terminal (D) thereof, the output signal Q1 of the D flip-flop FF1a. The D flip-flop FF3a receives, at the data input terminal (D) thereof, the output signal Q2 of the D flip-flop FF2a.

On the other hand, the D flip-flops FF1a, FF2a, and FF3a all receive, at the respective clock input terminals thereof, an internal clock pulse signal ICLK (a frequency-multiplied signal of the output pulse signal S1) that is synchronous with the output pulse signal S1 from the analog filter circuit AF1 (i.e., the clock pulse signal CLK as it has gone through filtering).

Thus, the D flip-flops FF1a, FF2a, and FF3a sample their respective input signals S2, Q1, and Q2 at a rising edge of the internal clock pulse signal ICLK (with a sampling period of t1).

The majority decision portion MAJ serves as means for outputting one of the output signals Q1 to Q3 from the D flip-flops FF1a, FF2a, and FF3a on a majority decision basis. More specifically, when two or more of the output signals Q1 to Q3 are at high level, the majority decision portion MAJ turns a majority decision signal M1 to high level; by contrast, when two or more of the output signals Q1 to Q3 are at low level, the majority decision portion MAJ turns the majority decision signal M1 to low level.

The latch portion LTC serves as means for latching the majority decision signal M1 at a rising edge of the output pulse signal S1 and then outputting the latched signal, as an output pulse signal S2' (i.e. the start pulse signal SP as it has gone through filtering and timing adjustment), to the logic portion LG.

With the configuration described above, the digital filter circuit DF can be built easily.

Next, another example of the configuration of the digital filter circuit DF and its operation will be described in detail.

Figure 9:
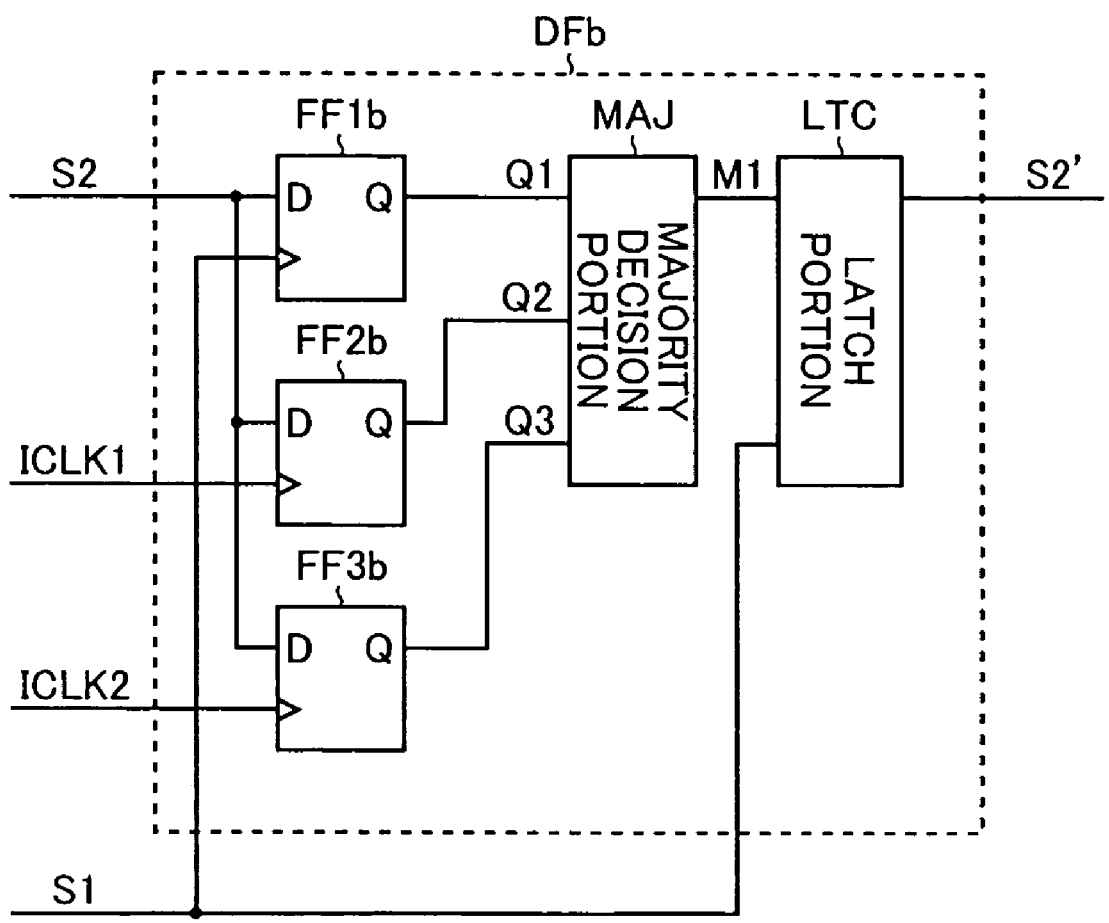
FIG. 9 is a circuit diagram showing another example of the configuration of the digital filter circuit DF.
Figure 10:
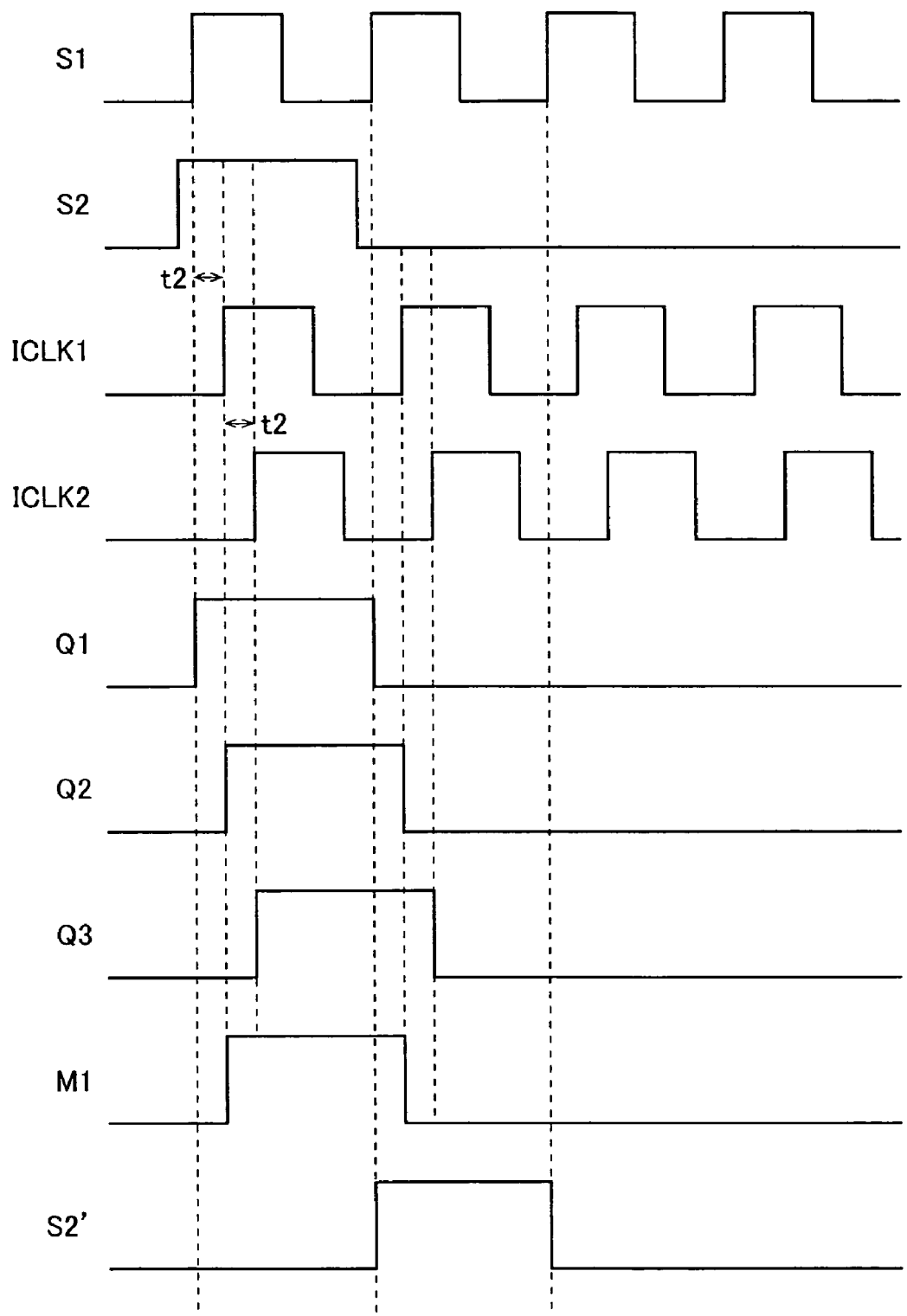
FIG. 10 is a diagram illustrating the operation of the digital filter circuit DFb.

FIG. 9 is a circuit diagram showing another example of the configuration of the digital filter circuit DF (hereinafter identified as the "digital filter circuit DFb"), and FIG. 10 is a diagram illustrating the operation of the digital filter circuit DFb.

As shown in FIG. 9, in this example of configuration, the digital filter circuit DFb includes D flip-flops FF1b, FF2b, and FF3b, a majority decision portion MAJ, and a latch portion LTC.

The D flip-flop FF1b receives, at the clock input terminal thereof, the output pulse signal S1 from the analog filter circuit AF1 (i.e., the clock pulse signal CLK as it has gone through filtering). The D flip-flop FF2b receives, at the clock input terminal thereof, a first internal clock pulse signal ICLK1 (a delayed pulse signal a predetermined period t2 lagging behind the output pulse signal S1). The D flip-flop FF3b receives, at the clock input terminal thereof, a second internal clock pulse signal ICLK2 (a delayed pulse signal the predetermined period t2 lagging behind the first internal clock pulse signal ICLK1).

On the other hand, the D flip-flops FF1b, FF2b, and FF3b all receive, at the data input terminals (D) thereof, the output pulse signal S2 from the analog filter circuit AF2 (i.e., the start pulse signal SP as it has gone through filtering).

Thus, the D flip-flops FFb, FF2b, and FF3b sample their input signal S2 at rising edges of the output pulse signal S1 and the first and second internal clock pulse signals ICLK1 and ICLK2, respectively.

The majority decision portion MAJ serves as means for outputting one of the output signals Q1 to Q3 from the D flip-flops FFib, FF2b, and FF3b on a majority decision basis. More specifically, when two or more of the output signals Q1 to Q3 are at high level, the majority decision portion MAJ turns a majority decision signal M1 to high level; by contrast, when two or more of the output signals Q1 to Q3 are at low level, the majority decision portion MAJ turns the majority decision signal M1 to low level.

The latch portion LTC serves as means for latching the majority decision signal M1 at a rising edge of the output pulse signal S1 and then outputting the latched signal, as an output pulse signal S2' (i.e. the start pulse signal SP as it has gone through filtering and timing adjustment), to the logic portion LG.

With the configuration described above, the digital filter circuit DF can be built without the need for multiplying the frequency of the output pulse signal S1. This helps reduce the device scale and the power consumption as compared with the previous example of configuration.

Although the embodiments described above deal with cases where the present invention is applied to an image sensor provided in a CIS module, it should be understood that analog filter circuits according to the present invention find application as filtering means elsewhere, for example, in lens-imaging-type image sensors and any other types of signal processing devices.

It should be understood that the present invention may be carried out in any manners other than specifically described as embodiments above, and that many variations and modifications are possible within the spirit of the present invention.

For example, although the embodiments described above deal with cases where the analog filter circuits are built with field-effect transistors, this is not meant to limit in any way the manner the present invention is practiced; specifically, instead of the field-effect transistors, bipolar transistors may be used. In that case, instead of the P-channel field-effect transistors, PNP-type bipolar transistors are used and, instead of the N-channel field-effect transistors, NPN-type bipolar transistors are used; moreover, the bipolar transistors are then so connected as if their emitters, collectors, and bases were the sources, drains, and gates of the field-effect transistors.

Although the second embodiment described above takes up an example where a digital filter circuit DF is provided only in the stage succeeding the analog filter circuit AF2 that receives the start pulse signal SP, another digital filter circuit may be inserted in the path of one of the other input signals.

As described above, according to the present invention, it is possible to provide a filter circuit that permits its filter constant to be set accurately in a wide range without relying on the driving capacity of the input signal and that can be integrated without an undue increase in device scale, and to provide an image sensor, an image sensor module, and an image reading apparatus incorporating such a filter circuit.

The present invention is directed to a technology for setting the filter constant of an analog filter circuit accurately in a wide range, which technology is useful in increasing the reading accuracy of image sensors and image sensor modules.

What is claimed is:

1. A filter circuit comprising:
    a first current mirror circuit that comprises a plurality of transistors and that passes a first mirror current according to a constant current;
    a second current mirror circuit that comprises a plurality of transistors and that, operating in inverted synchronism with the first current mirror circuit, passes a second mirror current according to a constant current;
    an input terminal via which an input pulse signal is fed in;

a first transistor that, in response to the signal fed in via the input terminal and by using a supply voltage, makes the first current mirror circuit operate;

a second transistor that, in response to the signal fed in via the input terminal and by using a ground voltage, makes the second current mirror circuit operate, the second transistor operating in inverted synchronism with the first transistor;

a capacitor that is charged by the first mirror current and that is discharged by the second mirror current; and an output terminal via which a voltage at one end of the capacitor is fed out.

2. The filter circuit of claim 1, wherein the first current mirror circuit comprises a third transistor and a fourth transistor, and the second current mirror circuit comprises a fifth transistor and a sixth transistor.

3. The filter circuit of claim 2, wherein the first, third, and fourth transistors are P-channel field-effect transistors or PNP-type bipolar transistors, and the second, fifth, and sixth transistors are N-channel field-effect transistors or NPN-type bipolar transistors.

4. The filter circuit of claim 1, wherein the first current mirror circuit and the first transistor are P-channel field-effect transistors or PNP-type bipolar transistors, and the second current mirror circuit and the second transistor are N-channel field-effect transistors or NPN-type bipolar transistors.

5. The filter circuit of claim 1, further comprising:
a first constant current source that feeds the first current mirror circuit with a constant current; and
a second constant current source that feeds the second current mirror circuit with a constant current.

6. The filter circuit of claim 1, further comprising:
a waveform shaping circuit that receives the voltage at the one end of the capacitor and that outputs an output pulse signal.

7. The filter circuit of claim 6, wherein the waveform shaping circuit comprises an output buffer.

8. The filter circuit of claim 6,
wherein the waveform shaping circuit has hysteresis.

9. The filter circuit of claim 1, further comprising:
an input buffer connected between the input terminal and the first and second transistors.

10. The filter circuit of claim 6, further comprising:
a sampling portion that samples the output pulse signal a plurality of times; and
a majority decision portion that outputs one of sampling results of the sampling portion on a majority decision basis.

11. An image sensor comprising:
a photodetective element;
a filter circuit that receives an input pulse signal fed in for a purpose of driving and/or controlling the image sensor and that performs wave shaping on the input pulse signal to output an output pulse signal; and
a logic portion that, based on the output pulse signal, produces an analog image signal by using the photodetective element and that controls pixel-by-pixel serial output of the analog image signal,
wherein the filter circuit comprises:
a first current mirror circuit that comprises a plurality of transistors and that passes a first mirror current according to a constant current;
a second current mirror circuit that comprises a plurality of transistors and that, operating in inverted synchronism with the first current mirror circuit, passes a second mirror current according to a constant current;
an input terminal via which the input pulse signal is fed in;

a first transistor that, in response to the signal fed in via the input terminal and by using a supply voltage, makes the first current mirror circuit operate;

a second transistor that, in response to the signal fed in via the input terminal and by using a ground voltage, makes the second current mirror circuit operate, the second transistor operating in inverted synchronism with the first transistor;

a capacitor that is charged by the first mirror current and that is discharged by the second mirror current; and an output terminal via which a voltage at one end of the capacitor is fed out.

12. An image sensor module comprising:
a plurality of image sensors;
wherein the image sensors each comprise:
a photodetective element;
a filter circuit that receives an input pulse signal fed in for a purpose of driving and/or controlling the image sensor and that performs wave shaping on the input pulse signal to output an output pulse signal; and
a logic portion that, based on the output pulse signal, produces an analog image signal by using the photodetective element and that controls pixel-by-pixel serial output of the analog image signal,
wherein the filter circuit comprises:
a first current mirror circuit that comprises a plurality of transistors and that passes a first mirror current according to a constant current;
a second current mirror circuit that comprises a plurality of transistors and that, operating in inverted synchronism with the first current mirror circuit, passes a second mirror current according to a constant current;
an input terminal via which the input pulse signal is fed in;
a first transistor that, in response to the signal fed in via the input terminal and by using a supply voltage, makes the first current mirror circuit operate;
a second transistor that, in response to the signal fed in via the input terminal and by using a ground voltage, makes the second current mirror circuit operate, the second transistor operating in inverted synchronism with the first transistor;
a capacitor that is charged by the first mirror current and that is discharged by the second mirror current; and
an output terminal via which a voltage at one end of the capacitor is fed out.

13. The image sensor module of claim 12, wherein the first current mirror circuit and the first transistor are P-channel field-effect transistors or PNP-type bipolar transistors, and the second current mirror circuit and the second transistor are N-channel field-effect transistors or NPN-type bipolar transistors.

14. The image sensor module of claim 12,
wherein the filter circuit further comprises:
a first constant current source that feeds the first current mirror circuit with a constant current; and
a second constant current source that feeds the second current mirror circuit with a constant current.

15. The image sensor module of claim 12,
wherein the filter circuit further comprises:
a waveform shaping circuit that receives the voltage at the one end of the capacitor and that outputs an output pulse signal.

16. The image sensor module of claim 15, wherein the waveform shaping circuit comprises an output buffer.

17. The image sensor module of claim 15,
wherein the waveform shaping circuit has hysteresis.

18. The image sensor module of claim 15,
wherein the filter circuit further comprises:
a sampling portion that samples the output pulse signal a plurality of times; and
a majority decision portion that outputs one of sampling results of the sampling portion on a majority decision basis.

19. The image sensor module of claim 12,
wherein the filter circuit further comprises:
an input buffer connected between the input terminal and the first and second transistors.

20. An image reading apparatus comprising:
an image sensor module,
wherein the image sensor module comprises:
a plurality of image sensors;
wherein the image sensors each comprise:
a photodetective element;
a filter circuit that receives an input pulse signal fed in for a purpose of driving and/or controlling the image sensor and that performs wave shaping on the input pulse signal to output an output pulse signal; and
a logic portion that, based on the output pulse signal, produces an analog image signal by using the photodetective element and that controls pixel-by-pixel serial output of the analog image signal,
wherein the filter circuit comprises:
a first current mirror circuit that comprises a plurality of transistors and that passes a first mirror current according to a constant current;
a second current mirror circuit that comprises a plurality of transistors and that, operating in inverted synchronism with the first current mirror circuit, passes a second mirror current according to a constant current;
an input terminal via which the input pulse signal is fed in;
a first transistor that, in response to the signal fed in via the input terminal and by using a supply voltage, makes the first current mirror circuit operate;
a second transistor that, in response to the signal fed in via the input terminal and by using a ground voltage, makes the second current mirror circuit operate, the second transistor operating in inverted synchronism with the first transistor;
a capacitor that is charged by the first mirror current and that is discharged by the second mirror current; and
an output terminal via which a voltage at one end of the capacitor is fed out.

\* \* \* \* \*